US012432005B2

(12) United States Patent
Krishnan et al.

(10) Patent No.: US 12,432,005 B2
(45) Date of Patent: Sep. 30, 2025

(54) ANTENNA STEERING THROUGH GNSS JAMMING, SPOOFING, AND AIRPLANE MANEUVERS

(71) Applicant: Honeywell International Inc., Charlotte, NC (US)

(72) Inventors: Vignesh Krishnan, Phoenix, AZ (US); Brian Schipper, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 398 days.

(21) Appl. No.: 18/181,459

(22) Filed: Mar. 9, 2023

(65) Prior Publication Data

US 2024/0305400 A1   Sep. 12, 2024

(51) Int. Cl.
  *H04K 3/00*   (2006.01)
  *H04B 7/0426*   (2017.01)

(52) U.S. Cl.
  CPC ............. *H04K 3/224* (2013.01); *H04B 7/043* (2013.01)

(58) Field of Classification Search
  CPC ........ H04K 3/224; H04B 7/043; G01S 19/21; G01S 19/36
  See application file for complete search history.

(56) References Cited

U.S. PATENT DOCUMENTS

| | | | |
|---|---|---|---|
| 6,388,610 B1 | 5/2002 | Przyjemski et al. | |
| 9,450,286 B1* | 9/2016 | Guerre | ..................... H01Q 1/18 |
| 10,024,973 B1* | 7/2018 | Alexander | ............ G01S 19/215 |
| 2008/0211730 A1* | 9/2008 | Woosnam | ............... H04H 20/61 343/878 |
| 2019/0341670 A1* | 11/2019 | Blennius | ................... H01Q 1/18 |
| 2020/0235843 A1* | 7/2020 | Zemany | ............... H01Q 3/2611 |

FOREIGN PATENT DOCUMENTS

| | | |
|---|---|---|
| EP | 0118729 A1 | 9/1984 |
| EP | 0266332 A1 | 5/1988 |
| EP | 3729937 A1 | 10/2020 |
| JP | 2013253928 A | 12/2013 |

OTHER PUBLICATIONS

B & H Photo, Video, Audio, "Shape ISEE+ 2-Axis Gimbal", downloaded Sep. 15, 2022 from https://www.bhphotovideo.com/c/product/1159848-REG/shape_isee_2_axis_gimbal.html, pp. 1 through 3.
Heng et al., "GNSS Multipath and Jamming Mitigation Using High-Mask-Angle Antennas and Multiple Constellations", IEEE Transactions on Intelligent Transportation Systems, vol. 16, No. 2, Apr. 2015, pp. 741 through 750.
European Patent Office, "Extended European Search Report", dated Aug. 1, 2024, from EP Application No. 24157370.8, from Foreign Counterpart to U.S. Appl. No. 18/181,459, pp. 1 through 7, Published: EP.

* cited by examiner

*Primary Examiner* — Ankur Jain
(74) *Attorney, Agent, or Firm* — Fogg & Powers LLC

(57) ABSTRACT

This disclosure describes systems and methods for providing antenna steering through GNSS jamming, spoofing, and airplane maneuvers. In certain embodiments, a device includes a GNSS antenna configured to receive GNSS signals transmitted from a plurality of GNSS sources; and a GNSS antenna support structure mounted within a vehicle, wherein the GNSS antenna is mounted to the GNSS antenna support structure, wherein the GNSS antenna support structure is configured to keep directionality of the GNSS antenna pointing up during motion of the vehicle.

18 Claims, 3 Drawing Sheets

ANTENNA STEERING THROUGH GNSS JAMMING, SPOOFING, AND AIRPLANE MANEUVERS

BACKGROUND

Vehicles receive global navigation satellite system (GNSS) signals to determine position, velocity, altitude, and other navigation parameters. However, GNSS signals are subject to interfering signals that can negatively affect the ability of a vehicle to determine the navigation parameters accurately. For example, the interfering signals may include spoofed signals (signals that attempt to imitate the GNSS signals but provide misleading information) and jamming signals (interfering signals that affect the vehicle's ability to receive the GNSS signals). As such, the aviation industry is trying to mitigate the effects of spoofed and jamming signals.

SUMMARY OF INVENTION

The following summary is made by way of example and not by way of limitation. It is merely provided to aid the reader in understanding some aspects of the described subject matter.

This disclosure describes systems and methods for providing antenna steering through GNSS jamming, spoofing, and airplane maneuvers. In certain embodiments, a device includes a GNSS antenna configured to receive GNSS signals transmitted from a plurality of GNSS sources; and a GNSS antenna support structure mounted within a vehicle, wherein the GNSS antenna is mounted to the GNSS antenna support structure, wherein the GNSS antenna support structure is configured to keep directionality of the GNSS antenna pointing up during motion of the vehicle.

BRIEF DESCRIPTION OF THE DRAWINGS

The present invention can be more easily understood, and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout the figures and text.

DETAILED DESCRIPTION

Figure 1:
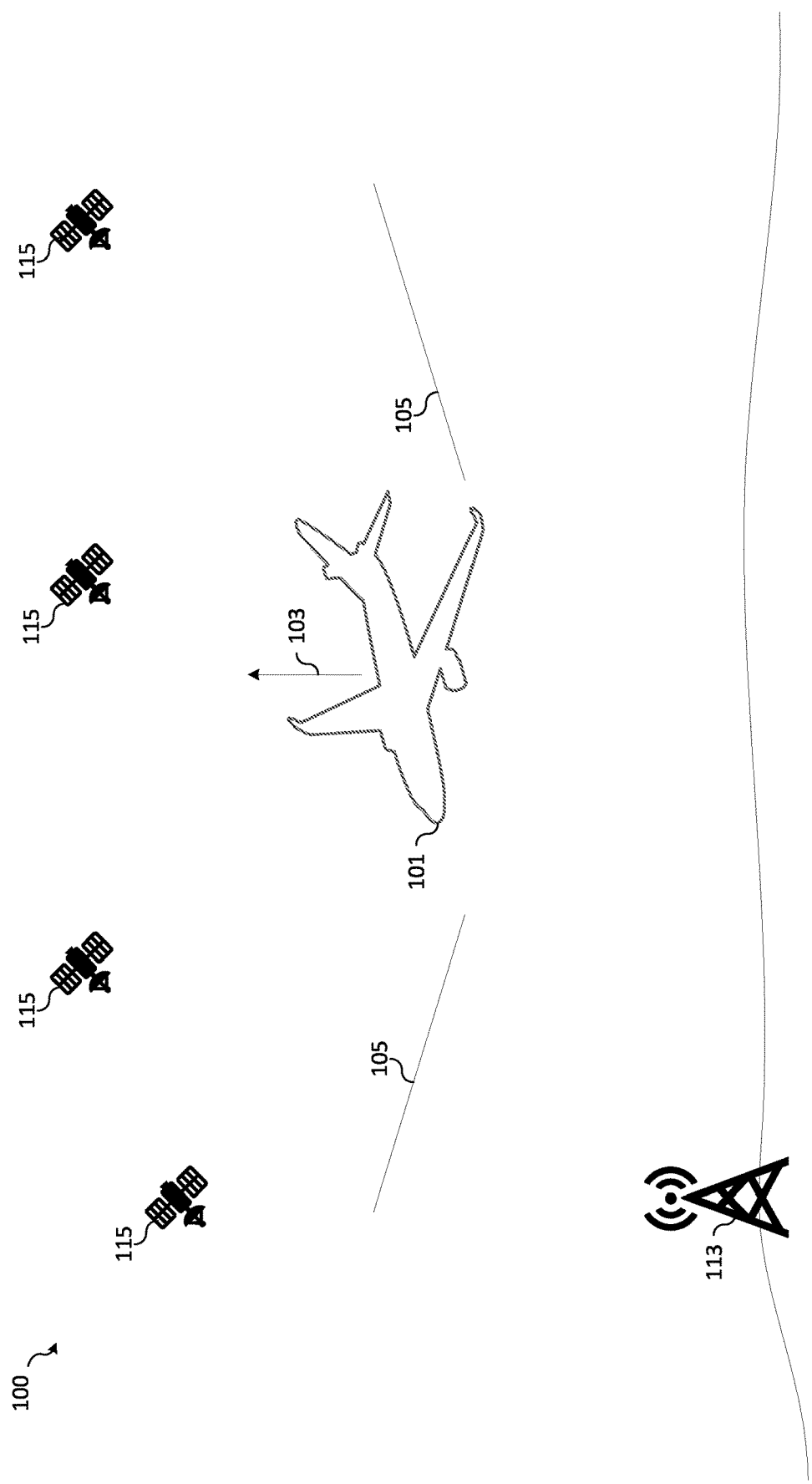
FIG. 1 is a diagram illustrating a vehicle in potential communication with different sources according to an exemplary aspect of the present invention.

In the following detailed description, reference is made to the accompanying drawings, which form a part hereof and in which are shown, by way of illustration, specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Systems and methods described herein provide for antenna steering through global navigation satellite systems (GNSS) jamming, spoofing, and vehicle maneuvers. A system can keep an antenna pointing toward a desired direction, such that the antenna coverage area covers the expected location of GNSS satellites, but the coverage area does not include reception of potential sources of jamming and spoofing. For example, sources of jamming and spoofing are generally located on the ground, while GNSS satellites are in the sky. Accordingly, a system may include equipment and electronics that keep the directionality of the antenna lobes of the GNSS antenna pointing towards the sky or location when the vehicle experiences movements that could potentially cause the antenna to point towards an area that could potentially include sources of jamming and spoofing. The equipment may include a gimbal structure that keeps the antenna pointing toward the area that includes the GNSS satellites but not the sources of jamming and spoofing. Alternatively, the equipment may include a control system that keeps the antenna pointing toward the area that includes the GNSS satellites but not the sources of jamming and spoofing.

A significant problem with existing GNSS receivers is that they are subject to jamming and spoofing. Jamming is the intentional or unintentional denial of the signal to the user, typically through radio frequency interference (RFI). Spoofing is a surreptitious attempt (by an unfriendly party) to feed a GNSS receiver false information so that the GNSS receiver computes an erroneous position, velocity, and/or time. In a typical spoofing scenario, a GNSS signal is received from a satellite and retransmitted with a higher power than the original signal from space. This indirect, deceptive GNSS signal is received by a GNSS receiver, which produces an inaccurate estimate of position, velocity, and time. The deceptive GNSS signal(s) can be derived from a retransmission of a single satellite's signal, retransmissions of a small number of satellites' signals, or retransmissions of signals from the entire visible constellation of satellites. Also, a deceptive GNSS signal(s) may be a signal carrying malicious or fake data transmitted within the GNSS frequency range, where the data is intended to appear as authentic GNSS data to a receiving system. The original, direct GNSS signal can be overcome by a signal from an RF jamming device or by the power of the indirect retransmitted signal itself. As such, the GNSS community has identified spoofing as a viable threat. However, sources of spoofing or jamming signals are frequently located on the ground, while the GNSS signals are located in the sky.

The antenna can be controlled to prevent a GNSS receiver from receiving jamming or spoofing signals. In particular, the antenna for the GNSS receiver may be pointed up such that the antenna is practically unable to receive the jamming and spoofing signals. For example, the antenna may be pointing in a direction that limits the antenna's ability to receive signals lower than a particular angle above the horizon (i.e., 10 degrees elevation). However, some vehicles, like aircraft, perform maneuvers during navigation that may cause the direction of the antenna to point in directions that cause the vehicle to lose signals from authentic GNSS satellites. Also, the antenna may point toward the ground and potentially receive the jamming or spoofing signals. These maneuvers can frequently occur during approach and landing procedures, which is a time that an aircraft may be especially reliant on accurate GNSS measurements. Thus, it is especially important to mitigate jamming and spoofing during that phase of flight.

Good GNSS satellite availability can be maintained and reception of jam/spoof signals can be prevented by mounting the antenna on a gimbal structure that keeps the antenna pointing in sufficiently the same direction during vehicle maneuvers. For example, the gimbal structure may keep the antenna pointing up when the vehicle is an aircraft experiencing pitching or rolling. Alternatively, the antenna may be mounted on an electric antenna control system, where the antenna control system includes electromechanical devices to control the pointing direction of the antenna.

With reference now to the figures, FIG. 1 depicts a pictorial representation of an example environment 100 where a vehicle 101 has systems for preventing the reception of jamming and spoofing signals by an antenna on the vehicle 101. For this example embodiment, the environment 100 includes a plurality of GNSS satellites 115. For clarity, only four satellites are shown, but it should be understood that existing and future satellite navigation systems can include more than four satellites visible at any time. Each satellite 115 includes a transmitter, which transmits a respective navigation signal for reception by antennas at other locations. The GNSS satellites 115 may transmit signals as part of a GNSS system of satellites. For example, the GNSS satellites 115 may be part of the Global Positioning System (GPS), the Global Navigation Satellite System (GLONASS) system, the Beidou navigation system, the Galileo positioning system, or other GNSS systems.

In exemplary embodiments, the environment 100 includes a vehicle 101 with a GNSS antenna mounted thereon. The GNSS signals are received through the antenna for processing by a GNSS receiver. As shown, the vehicle 101 may be an airborne vehicle (e.g., aircraft). However, it should be understood that a satellite navigation receiver can also be located in other types of vehicles, such as, for example, ships, ground-based vehicles (e.g., buses, trucks, automobiles, etc.), missiles, spacecraft, and also in hand-held devices.

During navigation, the vehicle 101 may pass through a region having an interfering source 113. As shown, the interfering source 113 is located on the surface of the terrain of the region. The interfering source 113 may emit jamming signals intended to interfere with the ability of a GNSS receiver on the vehicle 101 to receive signals from the satellites 115. For example, the interfering source 113 may emit jamming signals, which are signals transmitted in a frequency range similar to the GNSS signals at a transmission power such that the interfering signal will be received at a greater power than the GNSS signals from the satellites. As the interfering signals are received at a greater power than the GNSS signals, the GNSS receiver on the vehicle 101 may be unable to accurately receive the actual GNSS signals. In another situation, the interfering source 113 may emit spoofing signals. As described herein, a spoofing signal is a signal that is transmitted in such a way as to mimic an actual GNSS signal but provides erratic information. The reception of the erratic information by the GNSS receiver on the vehicle 101 may cause resultant navigation data to reflect the navigational states of the vehicle 101 inaccurately.

However, as illustrated, the satellites 115 are located in the sky, above the vehicle 101, and the interfering source 113 is on the ground, below the vehicle 101. In other words, the interfering source 113 is located on the opposite side of the vehicle 101 as the side of the vehicle 101 closer to the satellites 115. Accordingly, in certain embodiments, to avoid receiving the signals from the interfering source 113, the antenna that receives the GNSS signals may be controlled to always point in a direction 103 away from the interfering source 113 and towards the satellites 115. For example, the vehicle 101 may include an antenna support structure that keeps the antenna pointing in the direction 103. In particular, the support structure may be a gimbal-type structure or an electronic antenna pointing system. Further, the antenna on the vehicle 101 are designed to mask signals below a particular angle 105 relative to the horizon of the vehicle 101. In some implementations, the support structure may keep the antennas positioned to receive signals from GNSS satellites at low-elevation angles.

Figure 2:
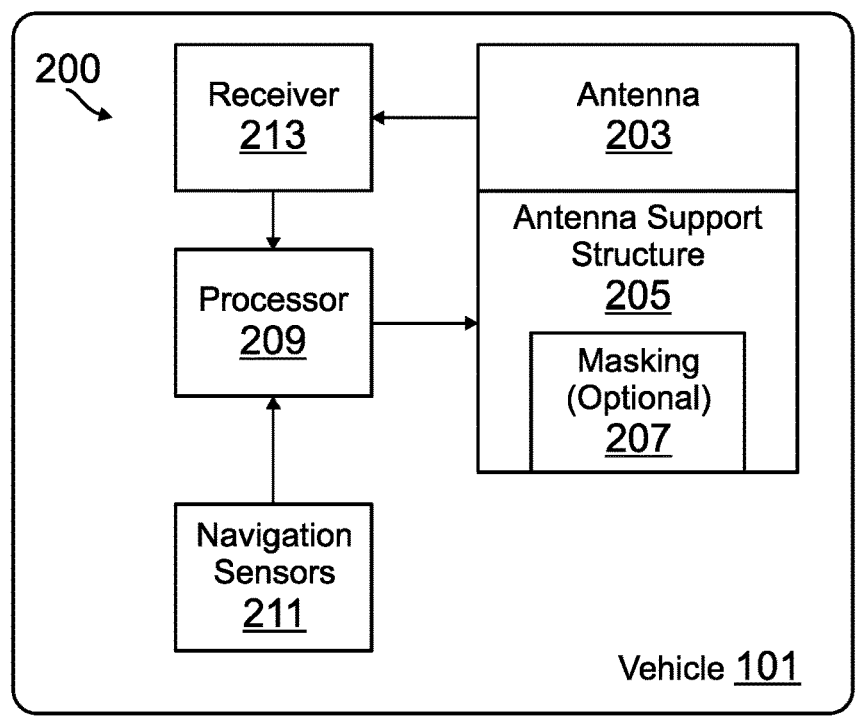
FIG. 2 is a block diagram of an antenna pointing system according to an exemplary aspect of the present invention.

FIG. 2 illustrates a block diagram of one embodiment of an antenna pointing system 200 for controlling the pointing direction for an antenna 203. As illustrated, the antenna pointing system 200 may include at least one receiver 213, a processor 209, an antenna support structure 205, and one or more navigation sensors 211. The one or more navigation sensors 211 and the at least one receiver 213 may be communicatively coupled to the processor 209. The processor 209 may function as a navigation computer. When the processor 209 functions as a navigation computer, the processor 209 may use the information received from the receiver 213 and the one or more navigation sensors 211 to calculate a navigation solution.

The different navigation sensors 211 provide signals to the processor 209. In some embodiments, the one or more navigation sensors 211 may include an inertial navigation system, an inertial measurement unit, which may include multiple accelerometers and gyroscopes that determine acceleration along and rate of rotation around one or more axes. Additionally, the one or more navigation sensors 211 may include other sources of navigation information such as a barometer, a magnetometer, an altimeter, among other sources of navigation information.

Additionally, the receiver 213 may be a Global Positioning System (GPS) receiver, a GLObal NAvigation Satellite System receiver, a BeiDou Navigation satellite system (BDS) receiver, a Galileo receiver, an Indian Regional Navigation Satellite System (IRNSS) receiver, or a receiver for another type or combination of satellite navigation systems. The at least one receiver 213 may provide the GNSS data to the processor 209.

In some embodiments, the processor 209 may use the different navigation information from the different sources of navigation information to calculate a navigation solution. The processor 209 may execute a statistical estimator, for example, a Bayesian filter, e.g., a Kalman filter. The statistical estimator may utilize kinematic data from the one or more navigation sensors 211 and the receiver 213 to more accurately determine a kinematic state of the vehicle 101 and to reduce errors associated with the produced navigation solution. A kinematic state describes a position, velocity, and/or angular orientation. The determined one or more kinematic states of a vehicle 101 include vehicle position, vehicle attitude, vehicle heading, and/or vehicle velocity. Vehicle position means vehicle altitude and vehicle horizontal position. Vehicle attitude means vehicle roll and vehicle pitch angles. However, spoofing or jamming signals may affect the accuracy of the determined kinematic state.

In certain embodiments, the antenna pointing system 200 may include an antenna support structure 205. The antenna support structure 205 may control the pointing direction of the antenna 203. As described herein, the antenna support structure 205 is a structure that keeps the antenna 203 pointing in a substantially constant direction. As used herein, the term "substantially" refers that antenna points at an initial direction and that the antenna points with a range of departures from the initial direction, where the range is within tolerances that enables the antenna to receive the signals from the desired signal sources but not from the interfering signal sources. In some embodiments, the antenna support structure 205 keeps the structure pointing in a substantially constant direction through a mechanical means like a gimbal or other physical device (flywheel, counterbalances, etc.) that detaches the pointing position of the antenna 203 from the motion of the vehicle 101. For example, the gimbal may refer to a device with multiple rotating axes that isolate the movement of the antenna 203 from the motion of the vehicle 101. In particular, the antenna 203 may be pointing in the up direction, toward the satellites, and away from interfering signal sources. When the vehicle 101 maneuvers, the antenna support structure 205 isolates the antenna 203 from the motion of the vehicle 101, such that the antenna 203 points in the up direction during the maneuver of the vehicle 101.

In alternative embodiments, the antenna support structure 205 may be an active antenna pointing system. For example, an active antenna pointing system may control the direction that the antenna 203 points in response to a control signal. For example, the antenna support structure 205 may receive a control signal from the processor 209. In response to the control signals, the antenna support structure 205 may include a series of actuators that convert the control signals into motion that moves the pointing direction of the antenna 203. For example, the processor 209 may identify the motion of vehicle 101 from the one or more navigation sensors 211 and the at least one receiver 213. From the identified motion, the processor 209 may calculate position adjustments that counteract potential effects of vehicle motion on the antenna 203. The processor 209 may then send control signals containing data describing the position adjustments to the antenna support structure 205 that decouple the pointing direction of the antenna 203 from the motion of the vehicle 101. In an alternative embodiment, the antenna support structure 205 may include an additional processor that receives navigation information from the processor 209 and identifies the control signals for directing the position of the antenna 203.

In some embodiments, the antenna support structure 205 may also include a masking structure 207. The masking structure 207 may be a structure next to the antenna 203 that prevents the antenna 203 from receiving signals through the antenna support structure 205. For example, the masking structure 207 may be a physical structure that prevents the antenna 203 from receiving signals below a predetermined angle in relation to the horizon line for the antenna 203. In one example, the masking structure 207 may prevent the antenna 203 from receiving signals from sources below a line five degrees above the horizon in relation to the antenna 203. As interfering signal sources are frequently below the horizon line, the use of masking structure 207 may help ensure that the antenna 203 does not receive interfering signals from the interfering signal sources.

In certain embodiments, some of the systems and methods described herein are implemented using a computational device or processor. As described, a processor 209 may process GNSS measurements, calculate navigational data, and provide control signals to the antenna support structure 205. The processor 209 may be implemented using software, firmware, hardware, or appropriate combinations thereof. In some implementations, a single processor may execute the functionality of any combination of the processor.

The processors or other computational devices may be supplemented by, or incorporated in, specially-designed application-specific integrated circuits (ASICs) or field programmable gate arrays (FPGAs). In some implementations, the processors and/or other computational devices can also include or function with software programs, firmware, or other computer-readable instructions for carrying out various process tasks, calculations, and control functions used in the methods and systems described herein.

Further, the processor 209 may be coupled to a computer memory device for storing and retrieving data. The memory device also interfaces with a computer system such that data can be read from and written to the memory device. In one embodiment, the memory device includes a controller for managing data access and a cache for storing frequently accessed data. The memory device may be implemented using various technologies, such as dynamic random access memory (DRAM), static random access memory (SRAM), flash memory, or other non-volatile memory technologies.

Figure 3:
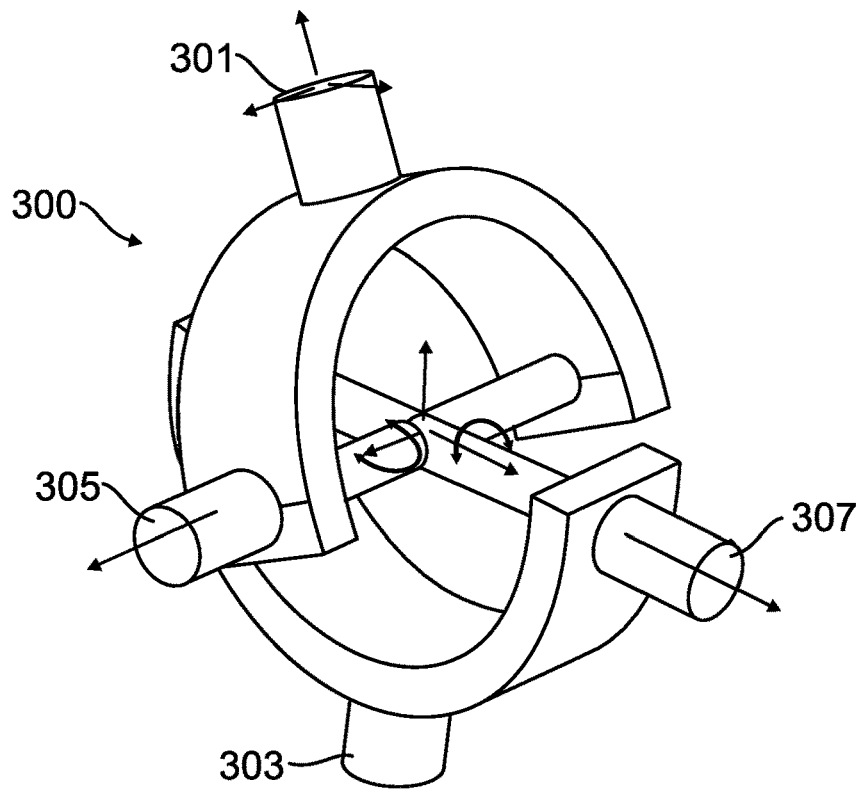
FIG. 3 is a diagram of a gimbal for use in antenna pointing structure according to an exemplary aspect of the present invention.

FIG. 3 is a diagram illustrating a gimbal 300 for use as an antenna support structure 205. As illustrated, the gimbal 300 includes various surfaces for mounting to an antenna and a vehicle surface. In particular, the gimbal 300 includes an antenna mounting surface 301 and a vehicle mounting surface 303. The antenna mounting surface 301 may physically connect the gimbal 300 to an antenna, and the vehicle mounting surface 303 may physically connect the gimbal 300 to a surface of a vehicle. Additionally, the gimbal 300 includes multiple rotational axes that decouple the motion of the vehicle mounting surface 303 from the antenna mounting surface 301. For example, the gimbal 300 may include a first axis 305 and a second axis 307 that are in the same plane but are orthogonal to one another. Further, the vehicle mounting surface 303 rotates around the second axis 307, and the antenna mounting surface 301 rotates around the first axis 305. By rotating around different planar and orthogonal axes, the gimbal 300 may decouple motion in roll and pitch experienced by the vehicle from the motion of the antenna coupled to the antenna mounting surface 301. As the motion of the antenna is decoupled from the pitch and roll of the vehicle, an upward-pointing antenna may continue to point up when the vehicle experiences any maneuvers.

Figure 4:
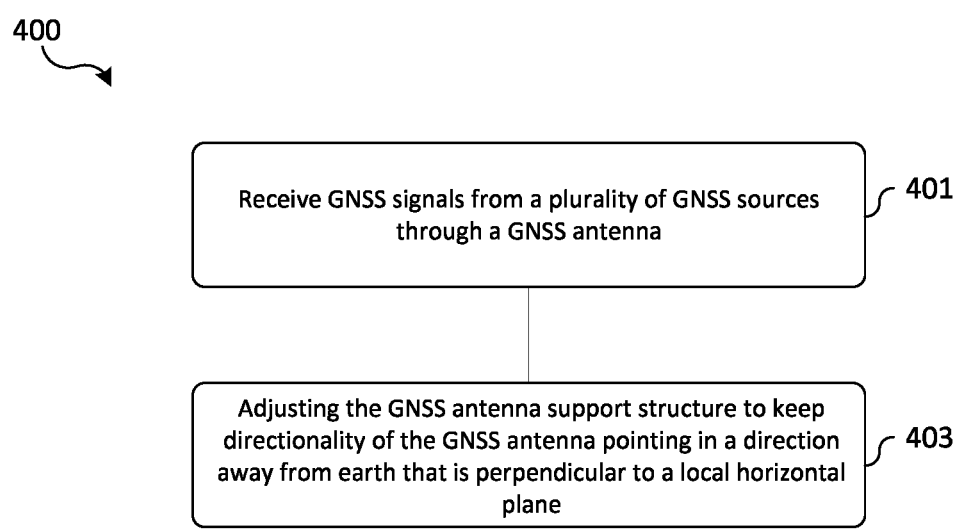
FIG. 4 is a flow diagram of a method for keeping an antenna pointing in a particular direction during aircraft maneuvers according to an exemplary aspect of the present invention.

FIG. 4 is a flow diagram of a method 400 for antenna steering through GNSS jamming, spoofing, and airplane maneuvers. In some embodiments, the method 400 proceeds at 401, where GNSS signals are received from a plurality of GNSS sources through a GNSS antenna. For example, the GNSS antenna is mounted on a GNSS antenna support structure that is mounted on a vehicle. The vehicle may travel over terrain, and the GNSS antenna may receive signals as it navigates. Further, the method 400 proceeds at 403, where the GNSS antenna support structure is adjusted to keep directionality of the GNSS antenna pointing up (in a direction away from the earth that is perpendicular to a local horizontal plane).

EXAMPLE EMBODIMENTS

Example 1 includes a device comprising: a GNSS antenna configured to receive GNSS signals transmitted from a plurality of GNSS sources; and a GNSS antenna support structure mounted within a vehicle, wherein the GNSS antenna is mounted to the GNSS antenna support structure, wherein the GNSS antenna support structure is configured to keep directionality of the GNSS antenna pointing up during motion of the vehicle.

Example 2 includes the device of Example 1, wherein the GNSS antenna support structure comprises a gimbal.

Example 3 includes the device of any of Examples 1-2, wherein the GNSS antenna support structure comprises an actuator that moves the GNSS antenna in response to control signals.

Example 4 includes the device of Example 3, wherein the control signals are produced by a processor in response to navigation information acquired from one or more navigation sensor.

Example 5 includes the device of Example 4, wherein the processor is part of the GNSS antenna support structure.

Example 6 includes the device of any of Examples 1-5, wherein the GNSS antenna support structure further keeps the directionality of the GNSS antenna pointing away from areas that pose a risk of containing one or more of interference signals and spoofing signals.

Example 7 includes the device of any of Examples 1-6, wherein the GNSS antenna support structure maintains the GNSS antenna in a position that allows the GNSS antenna to continue receiving satellite signals through dynamic maneuvers.

Example 8 includes the device of any of Examples 1-7, wherein the vehicle is an aircraft.

Example 9 includes a method comprising: receiving GNSS signals from a plurality of GNSS sources through a GNSS antenna, wherein the GNSS antenna is mounted on a GNSS antenna support structure that is mounted on a vehicle traveling over a terrain; and adjusting the GNSS antenna support structure to keep directionality of the GNSS antenna pointing in a direction away from earth that is perpendicular to a local horizontal plane.

Example 10 includes the method of Example 9, wherein the GNSS antenna support structure comprises a gimbal.

Example 11 includes the method of Example 10, wherein the gimbal decouples GNSS antenna motion from the motion of the vehicle comprising pitch and roll.

Example 12 includes the method of any of Examples 9-11, further comprising: receiving navigational information representing the motion of the vehicle; calculating position adjustments to the GNSS antenna that keep the GNSS antenna pointing away from the terrain; providing control signals to one or more actuators in the GNSS antenna support structure, wherein the control signals direct the one or more actuators to make the calculated position adjustments to the GNSS antenna; and moving the GNSS antenna to reflect the position adjustments.

Example 13 includes the method of any of Examples 9-12, further comprising keeping the directionality of the GNSS antenna pointing away from areas that pose a risk of containing one or more of interference signals and spoofing signals.

Example 14 includes the method of any of Examples 9-13, further comprising maintaining the GNSS antenna in a position that allows the GNSS antenna to continue receiving satellite signals through dynamic maneuvers.

Example 15 includes the method of any of Examples 9-14, wherein the vehicle is an aircraft.

Example 16 includes a system comprising: a vehicle; a GNSS antenna configured to receive GNSS signals transmitted from a plurality of GNSS sources; and a GNSS antenna support structure mounted to a surface of the vehicle and to the GNSS antenna, wherein the GNSS antenna support structure is configured to decouple GNSS antenna motion from vehicle motion in at least pitch and roll.

Example 17 includes the system of Example 16, wherein the GNSS antenna support structure comprises a gimbal.

Example 18 includes the system of any of Examples 16-17, wherein the GNSS antenna support structure comprises an actuator that moves the GNSS antenna in response to control signals.

Example 19 includes the system of Example 18, wherein the control signals are produced by a processor in response to navigation information acquired from one or more navigation sensor.

Example 20 includes the system of any of Examples 16-19, wherein the GNSS antenna support structure further keeps the directionality of the GNSS antenna pointing away from areas that pose a risk of containing one or more of interference signals and spoofing signals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A device comprising:
   a GNSS antenna configured to receive GNSS signals transmitted from a plurality of GNSS sources;
   a GNSS antenna support structure mounted within a vehicle, wherein the GNSS antenna is mounted to the GNSS antenna support structure, wherein the GNSS antenna support structure is configured to keep directionality of the GNSS antenna pointing up during motion of the vehicle; and
   a processor configured to:
      calculate position adjustments to the GNSS antenna that keep the GNSS antenna pointing up during the motion of the vehicle; and
      provide control signals to one or more actuators in the GNSS antenna support structure, wherein the control signals direct the one or more actuators to make the calculated position adjustments to the GNSS antenna.

2. The device of claim 1, wherein the GNSS antenna support structure comprises a gimbal.

3. The device of claim 1, wherein the GNSS antenna support structure comprises an actuator that moves the GNSS antenna in response to control signals.

4. The device of claim 3, wherein the control signals are produced by a processor in response to navigation information acquired from one or more navigation sensors.

5. The device of claim 4, wherein the processor is part of the GNSS antenna support structure.

6. The device of claim 1, wherein the GNSS antenna support structure further keeps the directionality of the GNSS antenna pointing away from areas that pose a risk of containing one or more of interference signals and spoofing signals.

7. The device of claim 1, wherein the GNSS antenna support structure maintains the GNSS antenna in a position that allows the GNSS antenna to continue receiving satellite signals through dynamic maneuvers.

8. The device of claim 1, wherein the vehicle is an aircraft.

9. A method comprising:
   receiving GNSS signals from a plurality of GNSS sources through a GNSS antenna, wherein the GNSS antenna is mounted on a GNSS antenna support structure that is mounted on a vehicle traveling over a terrain;

adjusting the GNSS antenna support structure to keep directionality of the GNSS antenna pointing in a direction away from earth that is perpendicular to a local horizontal plane;

calculating position adjustments to the GNSS antenna that keep the GNSS antenna pointing away from the terrain; and providing control signals to one or more actuators in the GNSS antenna support structure, wherein the control signals direct the one or more actuators to make the calculated position adjustments to the GNSS antenna.

10. The method of claim 9, wherein the GNSS antenna support structure comprises a gimbal.

11. The method of claim 10, wherein the gimbal decouples GNSS antenna motion from the motion of the vehicle comprising pitch and roll.

12. The method of claim 9, further comprising:
receiving navigational information representing the motion of the vehicle; and
moving the GNSS antenna to reflect the position adjustments.

13. The method of claim 9, further comprising keeping the directionality of the GNSS antenna pointing away from areas that pose a risk of containing one or more of interference signals and spoofing signals.

14. The method of claim 9, further comprising maintaining the GNSS antenna in a position that allows the GNSS antenna to continue receiving satellite signals through dynamic maneuvers.

15. The method of claim 9, wherein the vehicle is an aircraft.

16. A system comprising:
a vehicle;
a GNSS antenna configured to receive GNSS signals transmitted from a plurality of GNSS sources; and
a GNSS antenna support structure mounted to a surface of the vehicle and to the GNSS antenna, wherein the GNSS antenna support structure is configured to decouple GNSS antenna motion from vehicle motion in at least pitch and roll; and
a processor configured to:
calculate position adjustments to the GNSS antenna that keep the GNSS antenna pointing away from terrain over which the vehicle travels; and
provide control signals to one or more actuators in the GNSS antenna support structure, wherein the control signals direct the one or more actuators to make the calculated position adjustments to the GNSS antenna.

17. The system of claim 16, wherein the GNSS antenna support structure comprises a gimbal.

18. The system of claim 16, wherein the GNSS antenna support structure further keeps the directionality of the GNSS antenna pointing away from areas that pose a risk of containing one or more of interference signals and spoofing signals.

* * * * *